(12) United States Patent
Otsuka et al.

(10) Patent No.: US 7,362,883 B2
(45) Date of Patent: Apr. 22, 2008

(54) LANE MARKER RECOGNITION METHOD

(75) Inventors: Yuji Otsuka, Hitachi (JP); Shoji Muramatsu, Hitachi (JP); Hiroshi Takenaga, Nama-machi (JP); Jiro Takezaki, Hitachinaka (JP); Tatsuhiko Monji, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 350 days.

(21) Appl. No.: 10/305,251

(22) Filed: Nov. 27, 2002

(65) Prior Publication Data

US 2003/0103650 A1 Jun. 5, 2003

(30) Foreign Application Priority Data

Nov. 30, 2001 (JP) ............................. 2001-365493
Jun. 14, 2002 (JP) ............................. 2002-173569

(51) Int. Cl.
G06K 9/00 (2006.01)
G06K 9/66 (2006.01)
G06K 9/48 (2006.01)
G06F 19/00 (2006.01)
H04N 7/00 (2006.01)

(52) U.S. Cl. ..................... 382/104; 382/103; 382/106; 382/190; 382/199; 701/117; 701/207; 701/300; 348/116; 348/118

(58) Field of Classification Search ........ 382/103–106, 382/190, 199; 701/28, 117, 207, 300; 348/116, 348/118, 119
See application file for complete search history.

(56) References Cited

U.S. PATENT DOCUMENTS 4,819,169 A * 4/1989 Saitoh et al. ................. 701/28
4,970,653 A 11/1990 Kenue
5,245,422 A * 9/1993 Borcherts et al. ........... 348/119
5,247,587 A * 9/1993 Hasegawa et al. .......... 382/168
5,301,115 A 4/1994 Nouso ........................ 364/460
5,922,036 A * 7/1999 Yasui et al. .................... 701/28
5,987,174 A * 11/1999 Nakamura et al. .......... 382/199
6,002,793 A 12/1999 Silver et al.
6,053,268 A * 4/2000 Yamada ...................... 180/167

(Continued)

FOREIGN PATENT DOCUMENTS

JP 4-152406 5/1992

(Continued)

OTHER PUBLICATIONS

P. Gamba et al, "Vanishing Point Detection By A Voting Scheme" Proceedings of the International Conference on Image Processing. 1996, vol. 1 pp. 301-304.

(Continued)

Primary Examiner—Bhavesh M. Mehta
Assistant Examiner—Manav Seth
(74) Attorney, Agent, or Firm—Crowell & Moring LLP

(57) ABSTRACT

A lane marker recognition method comprises the steps of inputting an image including a lane marker, extracting luminance change points in the image, and estimating the position of the lane marker using the extracted edge points. The edge extracting step includes calculating an angle of orientation of each of the edges and the lane marker position estimating step includes extracting edge points that are oriented toward a vanishing point of a road, from among the edge points extracted in the edge extracting step.

9 Claims, 11 Drawing Sheets

U.S. PATENT DOCUMENTS

| | | | |
|---|---|---|---|
| 6,205,234 B1 * | 3/2001 | Kakinami et al. | 382/104 |
| 6,360,170 B1 * | 3/2002 | Ishikawa et al. | 701/300 |
| 6,493,458 B2 * | 12/2002 | Yasui et al. | 382/104 |
| 6,505,117 B1 * | 1/2003 | Ratert et al. | 701/209 |
| 6,577,334 B1 * | 6/2003 | Kawai et al. | 348/148 |
| 6,590,521 B1 * | 7/2003 | Saka et al. | 342/70 |
| 6,763,125 B2 * | 7/2004 | Ohta | 382/104 |
| 6,845,172 B2 * | 1/2005 | Furusho | 382/104 |
| 2002/0031242 A1 * | 3/2002 | Yasui et al. | 382/104 |
| 2002/0159616 A1 * | 10/2002 | Ohta | 382/104 |

FOREIGN PATENT DOCUMENTS

| | | |
|---|---|---|
| JP | 5-288534 A | 2/1993 |
| JP | 05-151341 | 6/1993 |
| JP | 11-195127 | 7/1999 |
| JP | 11-203445 | 7/1999 |
| JP | 2000-074646 | 3/2000 |

OTHER PUBLICATIONS

European Search Report dated Dec. 7, 2006 (Six (6) pages).
Japanese Office Action dated Dec. 5, 2006 and Translation.

* cited by examiner

FIG. 11
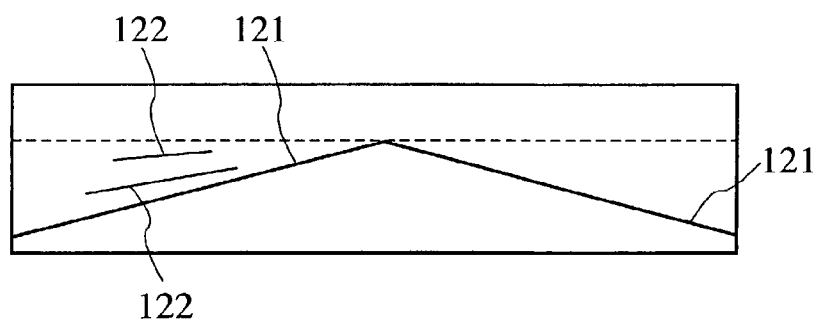
COEFFICIENT MATRIX IN
VERTICAL DIRECTION
COEFFICIENT MATRIX IN
HORIZONTAL DIRECTION
FIG.12A
FIG.12B
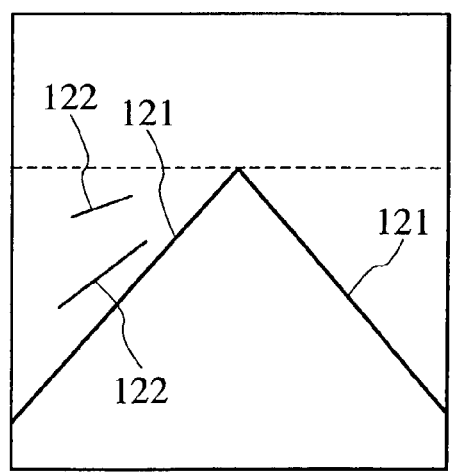

LANE MARKER RECOGNITION METHOD

BACKGROUND OF THE INVENTION

The present invention relates to a lane marker recognition method that uses road surface information obtained through a camera or other input means to recognize through image processing a vehicle running lane marker, and an apparatus using the same.

A technique has conventionally been proposed in which image processing is employed to recognize a white line or other lane marker placed on a road so as to give a driver a warning if his or her vehicle deviates from a cruising lane. Another technique proposed uses a result of lane marker recognition for steering control of the vehicle.

To recognize a white line through image processing, a common conventional approach sets a threshold value for luminance of an image so as to binarize the image, thereby recognizing a portion with a high luminance value as the white line. This approach uses a principle, in which, since the white line has a higher lightness than a surrounding road area, it accordingly exhibits a higher luminance value than the road area on the image. Setting the threshold value in luminance between the road area and the white line area allows the white line area only to be detected through binarization.

If an image has a shadowy white line, however, the shadowed portion of the white line exhibits a lower luminance than the remaining portion of the white line. This hampers proper detection of the shadowed portion of the white line by this approach. There is still another problem, in which, if the threshold value is set at the luminance level that allows the approach to detect the shadowed portion of the white line, this causes the approach to detect also areas other than the white line.

Japanese Patent Laid-open No. Hei 4-152406 discloses a technique, in which the threshold value is set based on a mean value and a maximum value of luminance of an entire image. This technique allows the threshold to be changed according to image conditions, which makes possible even more stabilized white line recognition.

There is, however, a problem inherent in this technique. That is, if image conditions change due to weather or shadow, the technique is no longer able to detect the white line properly.

There is another technique used to recognize the white line, in which an edge extraction is performed to recognize an outline of the white line, instead of binarization based on luminance. The edge extraction extracts a portion at which luminance of the image changes. Specifically, the technique uses the fact that the road area surrounding the white line is dark and there is a change in brightness at an edge of the white line. The technique then recognizes the portion, at which this change in brightness occurs, as the edge of the white line. Since the edge extraction is to detect the change in brightness, this offers an advantage that, even if brightness of a wide area of the image changes due to a change in weather, this is still able to detect the white line as long as there is a change in luminance at the edge of the white line. While being capable of extracting edges of the white line stably, the technique using the edge extraction is, however, likely extracts extra edge components on the road, such as a preceding vehicle and a rut.

A technique that discriminates the edge of the white line from others is therefore important.

Japanese Patent Laid-open No. Hei 11-195127 discloses a technique, in which edge angle information that is obtained when an edge point is obtained is used to determine the area enclosed by edge points that make an angle pair as the white line. This technique is based on the fact that a pair of edges comprising a left edge and a right edge of the white line is extracted from the white line and the difference in angle therebetween is approximately 180 degrees. If there are no edge points making an angle pair, the edge points can be eliminated from the white line.

If the distribution of edge points of the white line to be recognized in lane markers forms a linear line, the position angle information of the edge point can be used to estimate the white line portion as in the technique disclosed in Japanese Patent Laid-open No. Hei 11-195127. This conventional technique is not, however, concerned with a road, in which road studs are installed as the lane marker. Thus, it is unable to recognize road studs.

A technique is available for recognizing the road stud, in which a road stud pattern is registered as a template and the location of the road stud is detected through template matching. However, the size of the road stud on the image is generally small and the image of the road stud is highly susceptible to noise. This is a major obstacle to a stabilized recognition rate.

If an algorithm for white lines differs from that for road studs and, to recognize a lane marker on a road, on which both white lines and road studs are installed, it is necessary to correctly identify the type of the lane marker. This means that correct recognition cannot be made if the type of the lane marker is incorrectly identified even with excellent algorithms provided for both the white lines and road studs. Hence, an overall recognition rate is reduced.

SUMMARY OF THE INVENTION

It is therefore an object of the invention to provide an algorithm that is capable of stably recognizing a lane marker being composed of white lines or road studs without having to discriminate the type of the lane marker.

To achieve the foregoing object, there is provided a lane marker recognition method according to the present invention comprising the steps of: inputting an image including a lane marker; extracting an edge point, which is a luminance change point in the image input in the image inputting step, and calculating an angle representing an orientation of each of the edge points extracted; and estimating the position of the lane marker by extracting, from among the edge points extracted in the edge extracting step, edge points the angles of which are a predetermined value or fall within a predetermined range of values.

The edge extracting step is also provided with a step of extracting edge points that are located away from a vanishing point.

The lane marker position estimating step also performs the following operation. That is, it creates a histogram of edge points by angle from edge points having an angle toward the vanishing point of those edge points located away from the vanishing point and sets the angle with a high frequency as a lane marker angle.

Furthermore, the lane marker position estimating step performs linear estimation on a lane marker position from the distribution of edge points having the lane marker angle.

BRIEF DESCRIPTION OF THE DRAWINGS

Other objects and advantages of the invention will become apparent from the following description of embodiments with reference to the accompanying drawings in which:

FIG. 11 shows coefficient matrices of the 3×3 Sobel filter method as one technique used to detect edge positions; and FIGS. 12A and 12B are diagrams explaining advance processing performed on the input image in the lane marker recognition method according to the embodiment of the present invention.

DETAILED DESCRIPTION OF THE PREFERRED EMBODIMENTS

Figure 1:
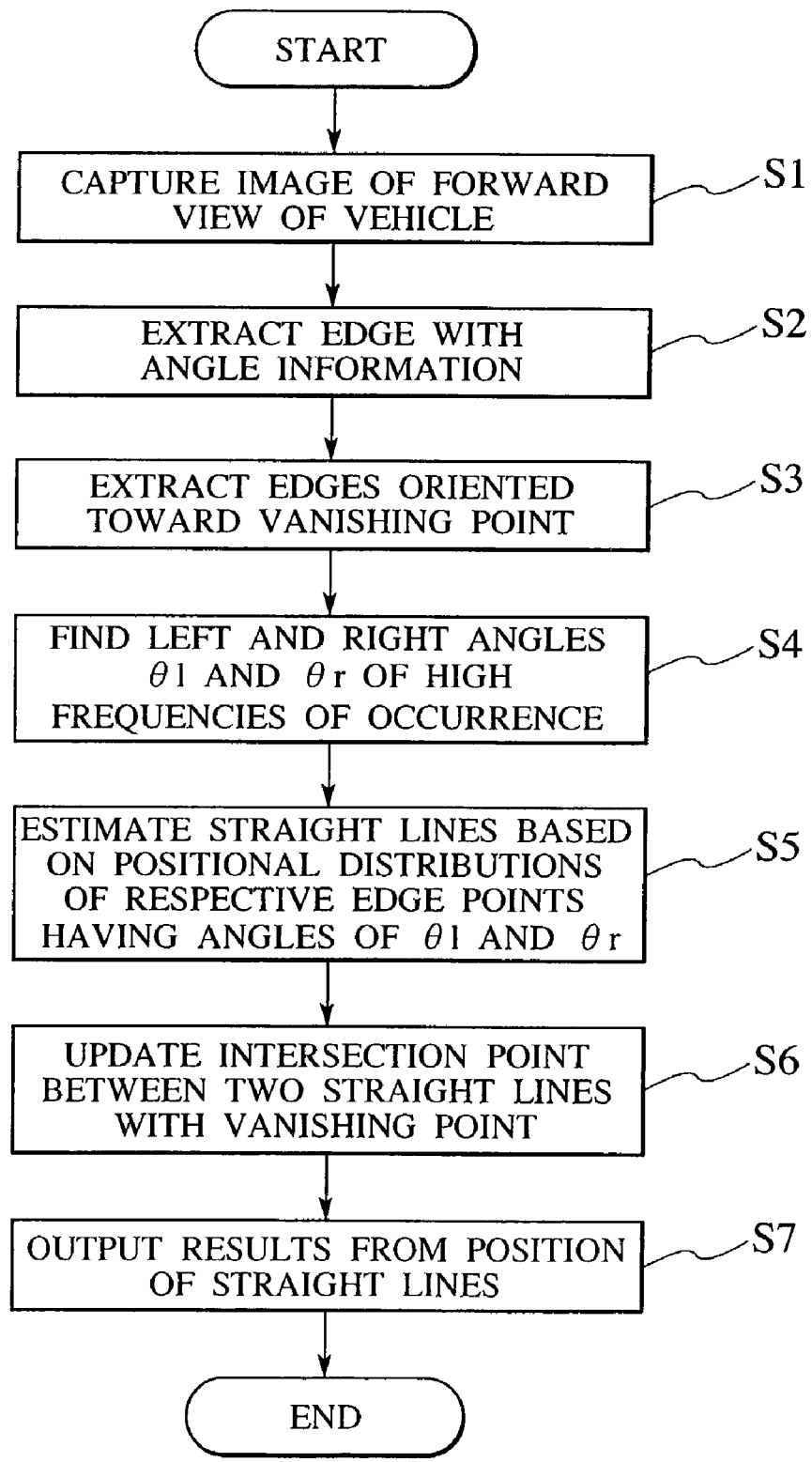
FIG. 1 shows a processing flow of the lane marker recognition method according to one embodiment of the present invention.

FIG. 1 shows a processing flow of the lane marker recognition method according to the present invention.

A lane marker recognition method according to one embodiment of the present invention includes the following steps: a vehicle forward image capturing step (step S1), or an image inputting step of inputting an image including a lane marker; an edge-with-angle-information extracting step (step S2) of taking a luminance change point of the image input through the vehicle forward image capturing step S1 as an edge and calculating an angle of orientation of the edge; an edge selecting step (step S3) of selecting edge points that are oriented toward a vanishing point of the road from the position and orientation angle of the edge point; lane marker position estimating steps (steps S4 to S5) of analyzing a distribution of positions of edge points aligned toward the vanishing point to determine the edge point of the lane marker; a step (step S6) of updating information about the vanishing point and the like; and a result output step (step S7) of producing an output of recognition results.

The vanishing point, as the term is used in this specification, refers to an infinite far point at which the lane markers on the left and right of a host vehicle intersect each other.

An overall configuration of a system to which the lane marker recognition method according to the embodiment of the present invention is applied will be first explained. A detailed description of each of the steps involved in the lane marker recognition method according to the embodiment of the invention will next be given.

Figure 10:
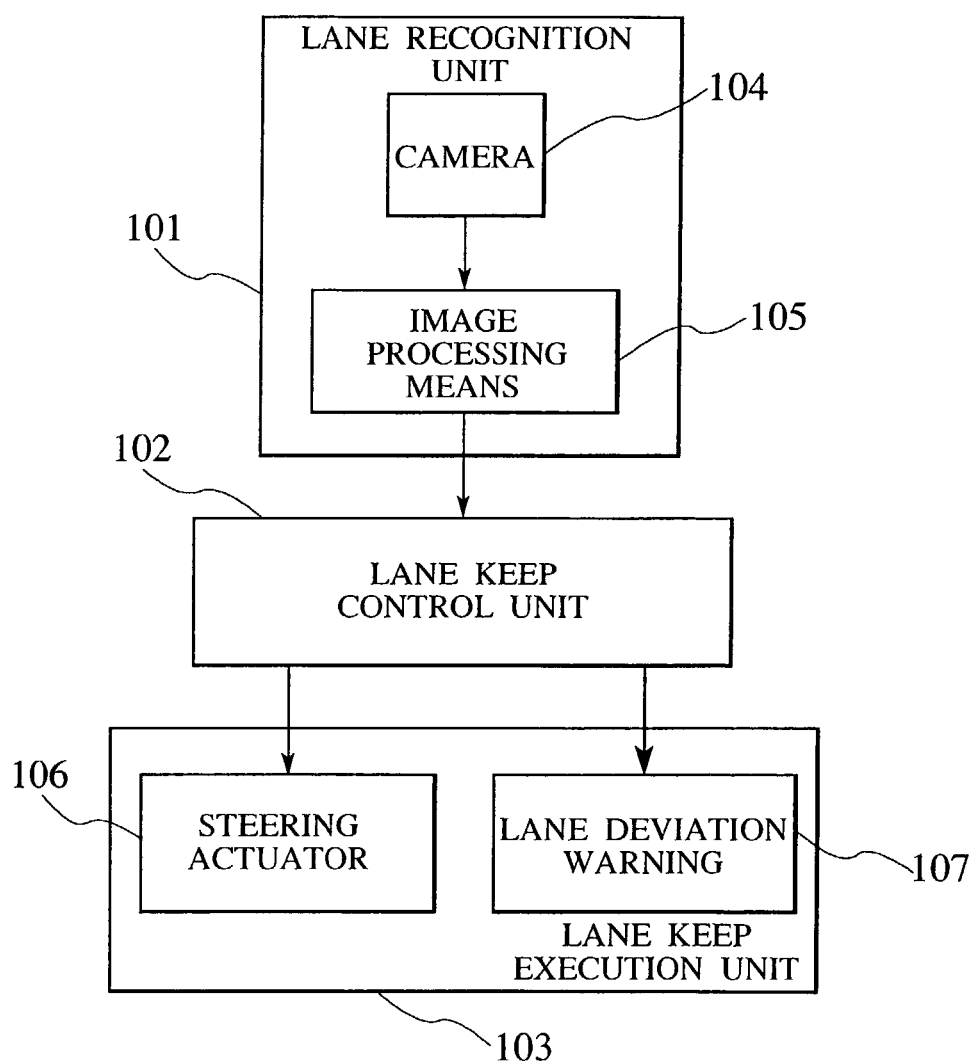
FIG. 10 is a system configuration block diagram employing the lane marker recognition method according to the embodiment of the present invention.

FIG. 10 shows a system, to which the embodiment of the invention is applied. A lane recognition unit 101 obtains a vehicle forward image through a camera 104 or other input means that is directed toward a front of a vehicle so as to transfer the image to an image processing means 105. The image processing means 105 follows the lane marker recognition method according to the invention to recognize the position of the lane marker on the image and calculate how much the host vehicle deviates from the lane. The amount of deviation will be explained with reference to FIG. 7. An amount of deviation S is 0 if a host vehicle 71 is traveling on the center of the lane, a positive value if the vehicle is traveling on the right side, and a negative value if the vehicle is traveling on the left side. The value can range from −1 to 1. The amount of deviation S calculated is transferred to a lane keep control unit 102. The lane keep control unit 102 controls a steering actuator 106 so as to return the vehicle to the center of the lane as necessary, or sounds a lane deviation warning unit 107 based on the amount of deviation S transferred thereto. That is, in the lane marker recognition method according to the embodiment of the invention, the image captured by the camera is analyzed, the position of the lane marker composed of white lines or road studs is detected, and the amount of deviation of the host vehicle with respect to the lane is calculated.

The lane marker recognition method will be explained in detail with reference to FIG. 1.

Figure 2A:
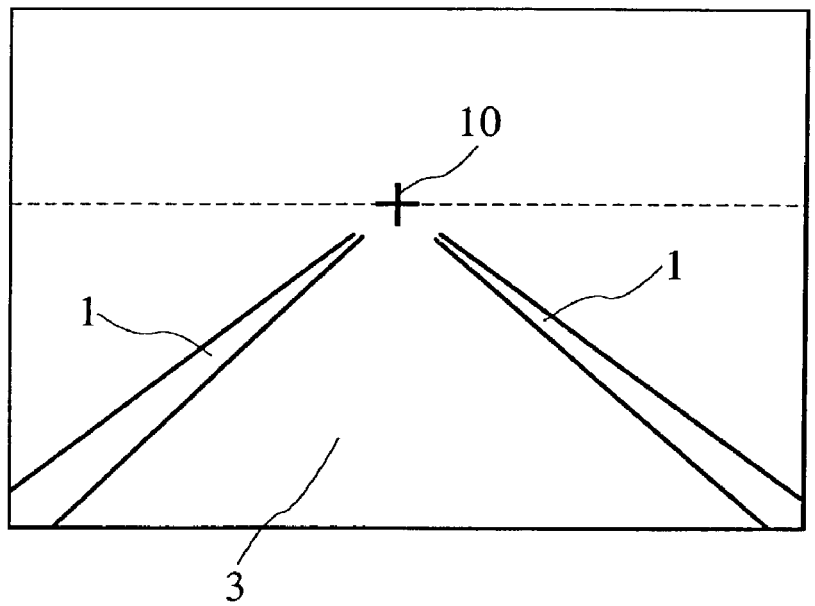
FIGS. 2A and 2B are diagrams each showing a view ahead of a vehicle, including a lane marker obtained through an image input step according to the embodiment of the present invention.
Figure 2B:
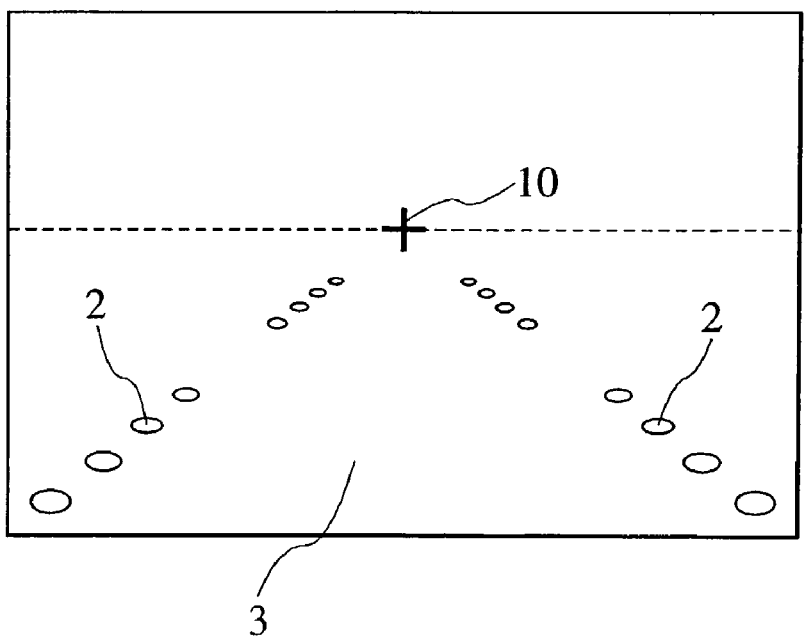

In step S1, the image ahead of the vehicle obtained through the camera as an input means is fetched and stored in an image memory in an image processing device. An absolute condition is that the image includes a lane marker composed of white lines or road studs as shown in FIG. 2. FIG. 2A shows an example of lane markers composed of white lines and FIG. 2B shows an example of lane markers composed of road studs.

In step S2, the luminance change point of the input image stored in the image memory is extracted as the edge and further calculated as data appended with angle information about the edge. This data representing each of the edge points includes position information x and y, and angle information $\theta$.

Here, the position information is a value in pixels on the screen, while the angle information $\theta$ represents the direction of the edge on the screen, the value of which can range from 0 degrees to 360 degrees. According to the embodiment, the direction of the edge is defined as a direction that tilts by 90 degrees to the left in relation to the direction of higher luminance. To tilt the direction of the edge through 90 degrees in relation to the direction of higher luminance is to align the direction with the orientation of an outline by the edge. The embodiment is not concerned with the direction of tilt and the edge direction may be tilted to the right. Generally speaking, the luminance of white lines 1 and road studs 2 is relatively higher than that of a surrounding road surface 3. The direction of the edge is therefore as shown in FIG. 3 according to the definition of the embodiment.

Figure 3A:
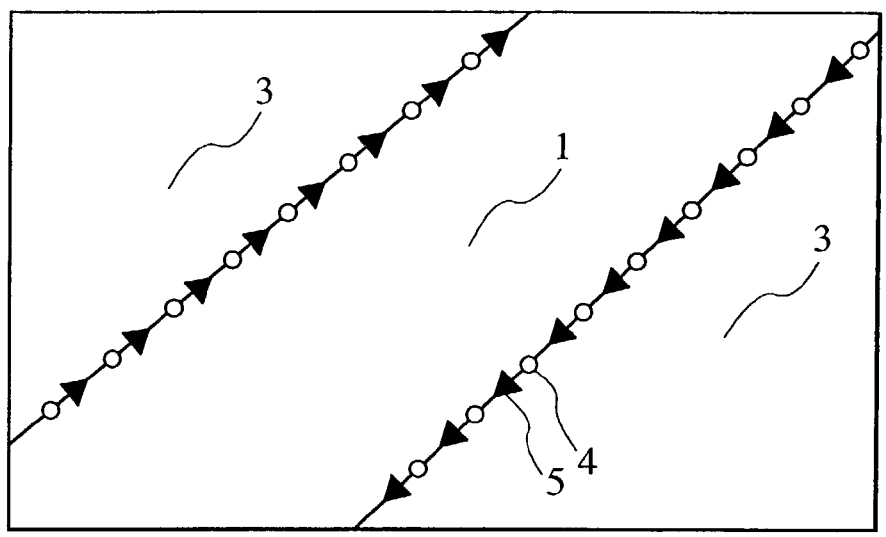
FIGS. 3A and 3B are diagrams each showing a direction of an edge point of the lane marker in the lane marker recognition method according to the embodiment of the present invention.
Figure 3B:
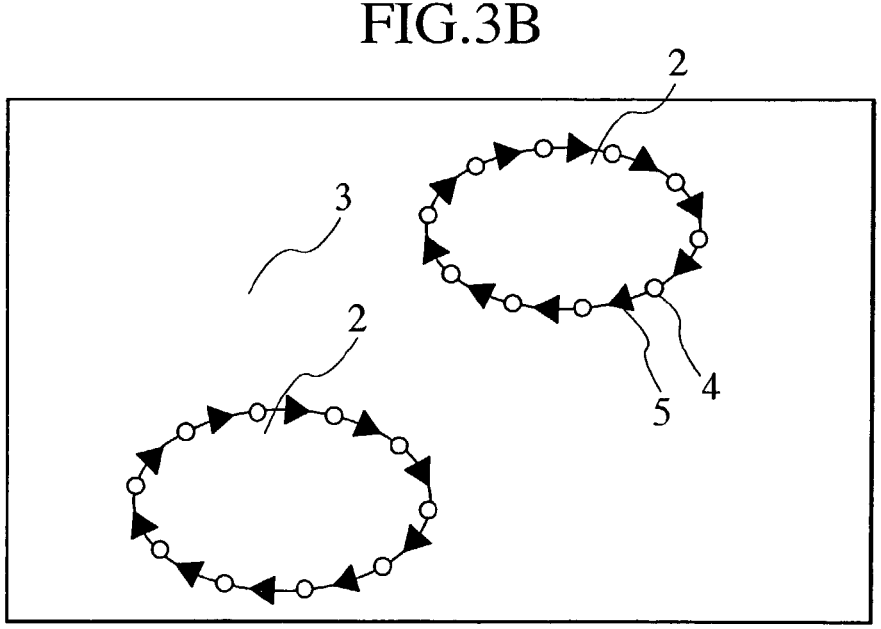

FIG. 3A is an enlarged view of the white line 1 and FIG. 3B is an enlarged view of the road stud 2. In FIGS. 3 A and 3B, a blank dot represents an edge point 4 obtained and an arrow represents a direction 5 of the edge point. Since the edge direction is tilted to the left in relation to the direction of higher luminance, the luminance on the right side in the direction of the edge is high, while that on the left side is low. The road stud 2 shown in FIG. 3B is circular; however, the shape may be a rectangle or other. A method of extracting edge points will be detailed later. There are a number of elements existing on actual road surfaces that are taken as edges in addition to the lane marker. They include a preceding vehicle, a trace of slippage and other contaminant, a pattern, a shade of a street tree and the like. All of these edges serve as unwanted noise for lane marker recognition. Noise is therefore separated in steps S3 and onward.

In step S3, those edge points that serve as noise are eliminated, while retaining lane marker edge points as many as possible. To accomplish this task, only the edge points that are oriented toward the vanishing point are selected by taking advantage of the fact that the lane marker is oriented toward the vanishing point. That is, those edge points that are not oriented toward the vanishing point are eliminated. A method used for making this selection is as follows. An equation for a straight line that passes through x and y and has an angle of $\theta$ is first obtained from the information x, y, and $\theta$ of the edge point. The distance between the straight line and the vanishing point is then obtained. If the distance is smaller than a predetermined threshold value, it is determined that the edge point is oriented toward the vanishing point and left as a candidate for the lane marker. Providing the predetermined threshold value allows the angle of the edge point to be extracted to have a certain amount of latitude. This provides an advantage of reducing the effect of a deviated angle caused by noise. Edge points that are originally close to the vanishing point are then eliminated regardless of their values of $\theta$. These edge points that are originally close to the vanishing point are those of an object located far away in an actual space. The lane marker is therefore projected as an extremely small element near the vanishing point on the screen. As a result, there are a small number of edge points of the lane marker near the vanishing point. This makes for a higher ratio of edge points representing objects other than the lane marker that are noise.

Available as a means of determining whether or not an edge point is close to the vanishing point is to simply calculate the distance between the vanishing point and the edge point on the screen. Specifically, all edge points that are located inside a circle or an ellipse with a predetermined radius around the vanishing point are eliminated. Another method that takes into account a calculation cost is to use the difference in a y-coordinate value. According to this method, the difference in the y-coordinate value between the vanishing point and the edge point is obtained. If the difference is a predetermined threshold value or less, then the edge point is considered to be close to the vanishing point and thus eliminated. The reason why the y-coordinate value is used is as follows. That is, for the lane marker on the road surface, an angle of depression from the camera can be obtained from a y-coordinate position thereof on the screen, which makes it possible to find the actual distance together with the height at which the camera is installed.

Figure 4A:
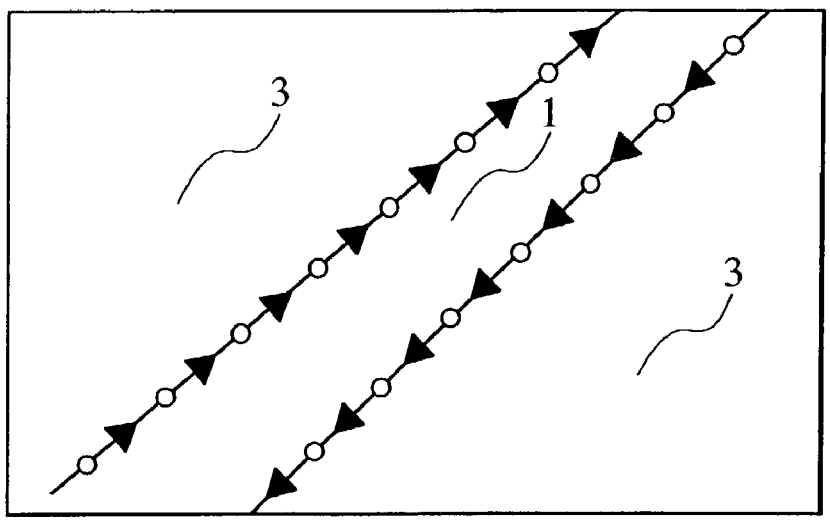
FIGS. 4A and 4B are diagrams each illustrating an edge point that is oriented toward a vanishing point on the assumption that the vanishing point is located at an upper right side in the lane marker recognition method according to the embodiment of the present invention.
Figure 4B:
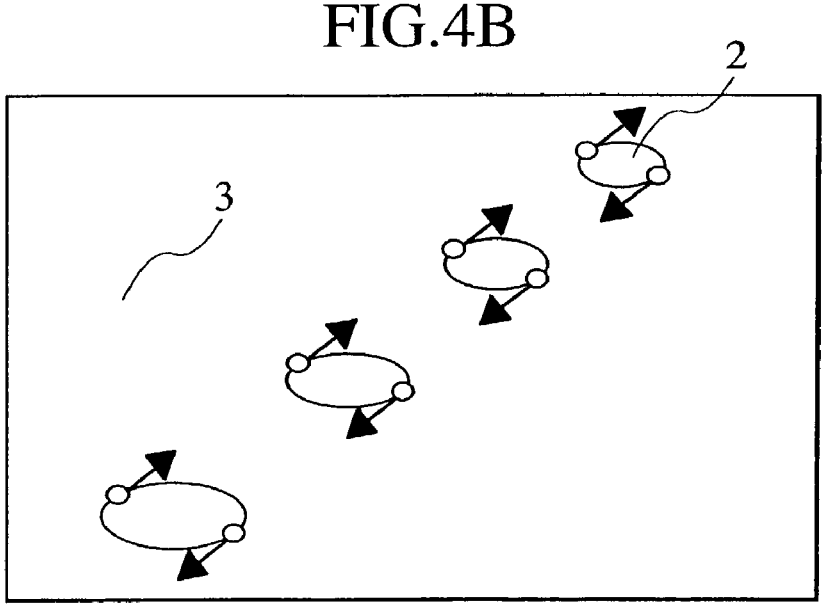

Removing edge points near the vanishing point in advance gives the effect of reducing noise. Through the procedure to select these edge points as described in the foregoing, it is possible to select only the edge points that are oriented toward the vanishing point of those edge points located on a front side away from the vanishing point. FIGS. 4A and 4B show the results of selection of edge points when the vanishing point is located on an upper right side for the white line 1 and the road stud 2, respectively. With the white line 1, substantially all of the edge points 4 are left. With the road stud 2, on the other hand, almost all of the edge points 4 are eliminated. However, the edge points on a left end and on a right end, which have the same directional component as the white line 1, are left. This makes possible the same processing that follows as with the white line. This selection procedure eliminates most of the edge points that serve as noise of elements other than the lane marker, while leaving those edge points that run parallel with the lane marker. They are subjected to discrimination through analyses made in steps S4 and onward. The position of the vanishing point is not constant and varies for varying degrees of tilt of the host vehicle with respect to the lane, requiring calculation whenever a frame changes. In this step, however, the position of the vanishing point obtained in a preceding frame is used. This takes advantage of the fact that the position of the vanishing point does not change considerably within a short period of time. A default position of the vanishing point, which has been previously defined from the position at which the camera is installed, is used at the very start of the processes. The method used to find the vanishing point will be explained in the description of step S6.

Figure 5A:
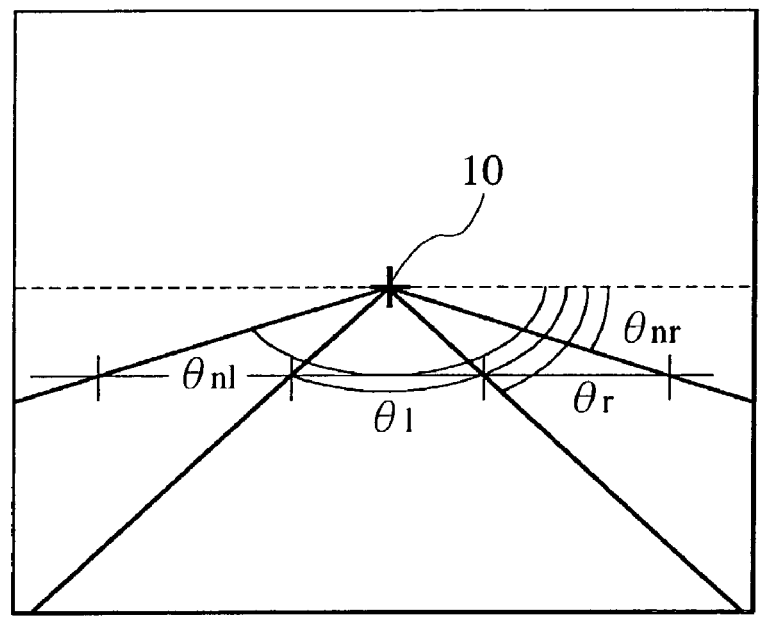
FIGS. 5A and 5B are diagrams explaining an edge angle histogram of the lane marker recognition method according to the embodiment of the present invention.
Figure 5B:
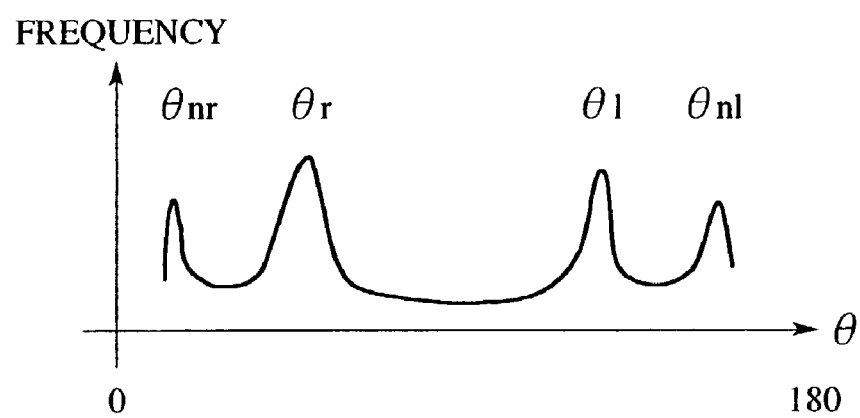

In step S4, the angles of the right and left lane markers of the host vehicle are estimated using the angle information of the edge points extracted in step S3. According to the embodiment, an edge angle histogram is used for analysis. More specifically, a histogram is created of all pixels that make up the edges according to each edge angle. In this edge angle histogram, pixels of an edge angle in a given direction available in large numbers appear as a peak. For example, assume that only a single straight white line exists in the image. Then, peaks appear for certain particular edge angles. A histogram is therefore created as shown in FIG. 5B and, from among the angles that form peaks, respective angles $\theta l$ and $\theta r$ of the left and right lane markers are estimated. In the examples shown in FIGS. 5A and 5B, a deviation of 180 degrees is ignored and, for any angle exceeding 180 degrees, the value of any of these angles, from which 180 degrees are subtracted, is used to create the histogram. With the white line 1 and the road stud 2, a pair of edges appears on the left end and the right end with a deviation of approximately 180 degrees from each other as shown in FIGS. 4A and 4B. These edges are paired up with each other to produce an effect of yielding peaks more readily. In effect, however, noise components very often form peaks and, to provide a markered difference from these peaks, the estimation is made using information about the lane width. Since the lane width remains substantially constant, it is possible to limit the combination of angles $\theta l$ and $\theta r$ of the left and right lane markers. If there are a number of lanes as in the example shown in FIG. 5A, use of an angle $\theta nl$ or $\theta nr$ of the adjacent lane marker allows $\theta l$ and $\theta r$ to be estimated. Also in this case, the fact that the lane width remains substantially constant is used.

In step S5, straight lines of the left and right lane markers are estimated based on the distribution of edge points having angles of $\theta l$ and $\theta r$. It is of course possible that the lane marker is curved at a curve. Effects of this curve can nonetheless be substantially ignored. This is because of the following reason. In step S3, all edge points near the vanishing point are elminated and only the edge points of the lane marker on the front near the host vehicle are used. This allows the characteristic, which each of parts of a curve can be approximated by a straight line, to be used. Hough transform is used for linear approximation of the lane marker. The Hough transform is a technique that derives a straight line passing through the greatest number of points from an arrangement of a number of points. It is a common technique employed in image processing and the explanation thereof is omitted. The procedure up to linear approximation of the lane marker will be explained with reference to FIG. 6.

Figure 6:
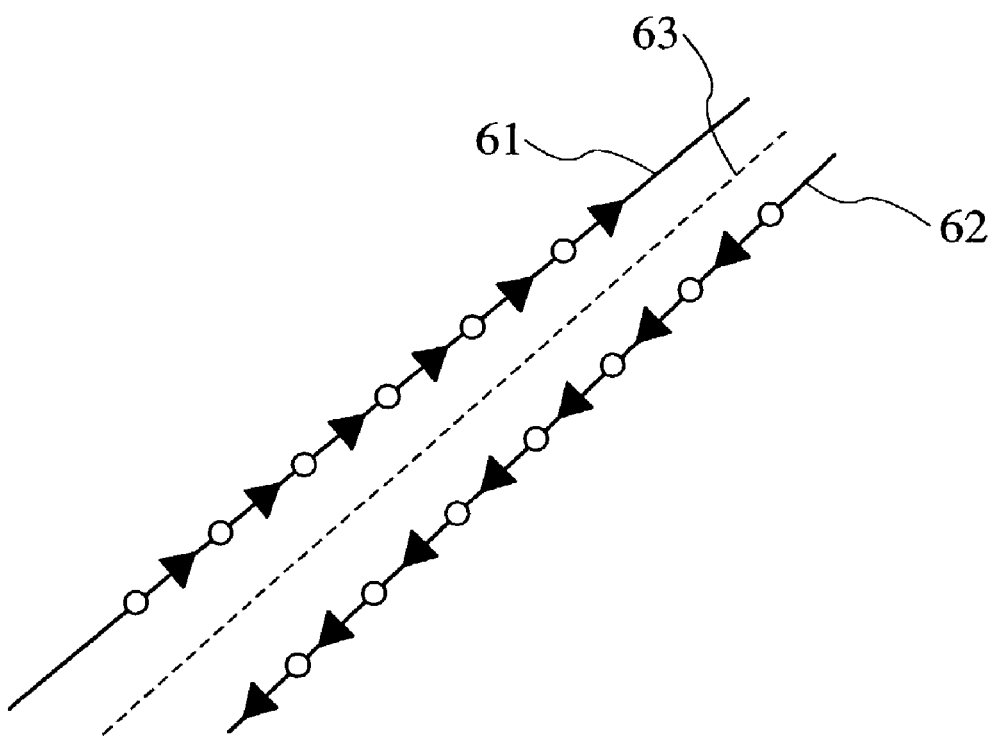
FIG. 6 is a diagram explaining linear approximation of the lane marker recognition method according to the embodiment of the present invention.

FIG. 6 shows an example of the white line on the left side of the host vehicle. The white line involves edges on both the left and right ends. Hough transform is therefore carried out for each of the edge point on the left end and the edge point on the right end. Suppose that the angle of the left white line obtained in step S4 is θl. Then, it can be estimated that an orientation angle of the edge point on the right end is θl and the orientation angle of the edge point on the left end is θl+180 as it is opposite to the former. Hough transform is then performed from the distribution of edge points having angles close to θl and the straight line obtained through the Hough transform is designated as a line 62 on the right side of the white line. Similarly, the Hough transform is performed from the distribution of edge points having angles close to θl+180 and the straight line obtained through the Hough transform is designated as a line 61 on the left end of the white line. From two straight lines obtained through these procedures, a centerline 63 is obtained and designated as the left white line. These explanations made for the white line are also applicable to the road stud. Least squares approximation or the like may be used instead of Hough transform used for the linear approximation.

In step S6, the vanishing point is calculated. The vanishing point may be calculated as an intersection point between the left and right lane marker straight lines calculated in step S5. The vanishing point is generally placed in a curved direction when the lane marker curves at a curve. Far edge points are, however, ignored according to the embodiment and the intersection point of straight lines approximated from the lane markers in front is designated as the vanishing point. The vanishing point obtained in this manner less fluctuates due to the curve. It is then possible to limit the range of fluctuations, making for an easy estimation analysis of the position of the vanishing point.

Figure 7A:
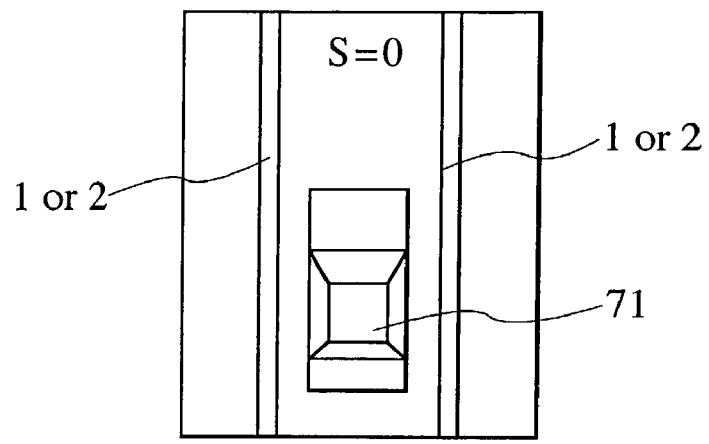
FIGS. 7A, 7B, and 7C are diagrams illustrating an amount of deviation S in relation to the lane of the host vehicle in the lane marker recognition method according to the embodiment of the present invention.
Figure 7B:
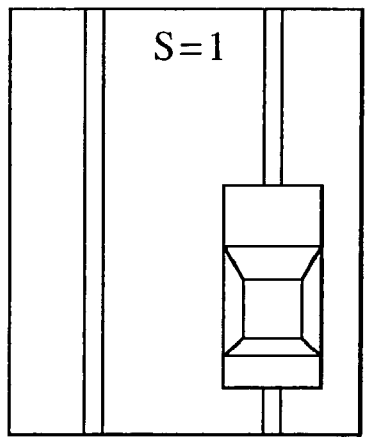
Figure 7C:
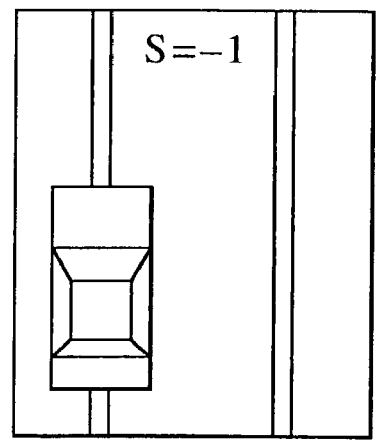
Figure 8:
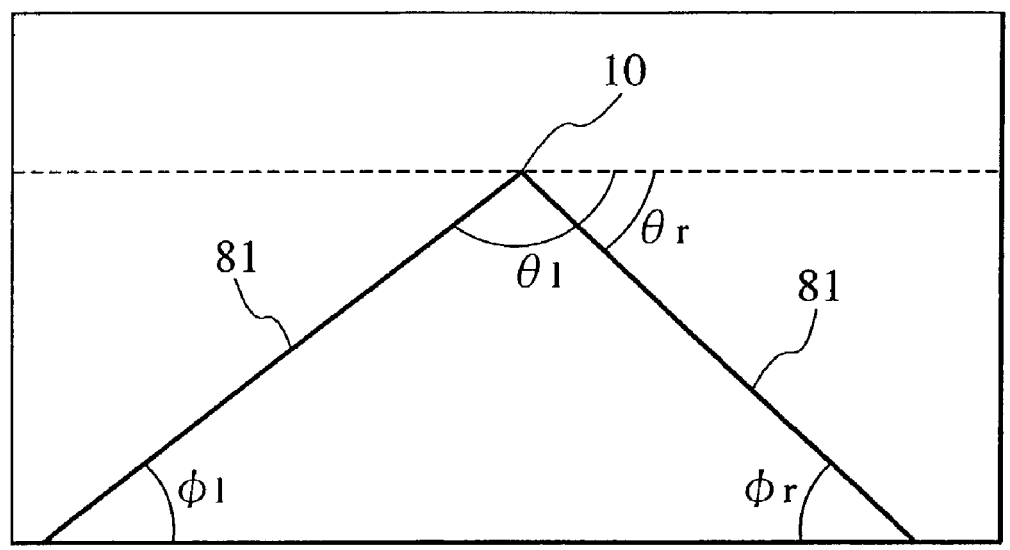
FIG. 8 is a drawing explaining how to find the amount of deviation S from the lane of the host vehicle in the lane marker recognition method according to the embodiment of the present invention.

An output of results of recognition is produced in step S7. The information to be output is the amount of deviation S of the host vehicle in relation to the lane (FIG. 7). The amount of deviation S can range from −1 to 1. It is 0 if a host vehicle 71 runs along the center of the lane (FIG. 7A), 1 if the vehicle 71 is on the right lane marker (FIG. 7B), and −1 if the vehicle 71 is on the left lane marker (FIG. 7C). The amount S can be obtained using equation (1) and the angle formed by two linear approximated lines 81 shown in FIG. 8.

$$S = 2\tan\phi r/(\tan\phi l + \tan\phi r) - 1 \quad (1)$$

Where, $$\phi l = 180 - \theta l, \quad \phi r = \theta r \quad (2)$$

Figure 9A:
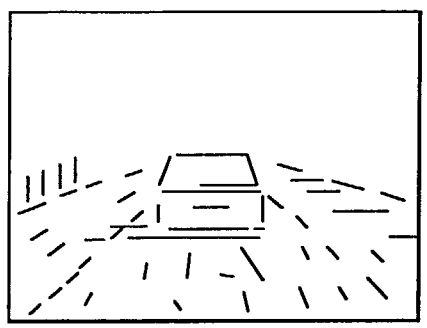
FIGS. 9A, 9B, 9C, 9D, and 9E each depict a step involved in the processing flow of the lane marker recognition method according to the embodiment of the present invention.
Figure 9B:
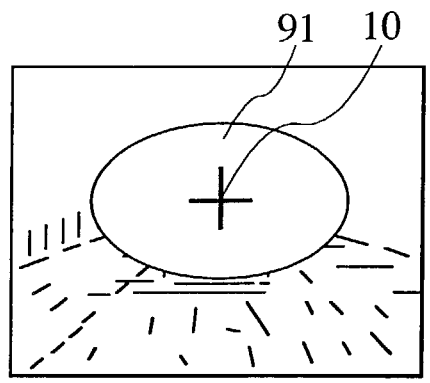
Figure 9C:
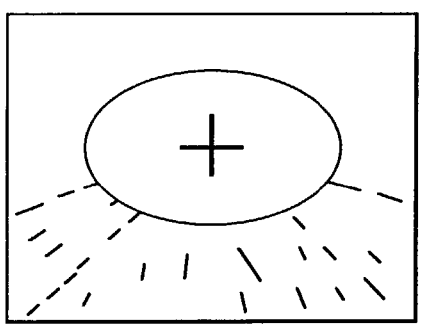
Figure 9D:
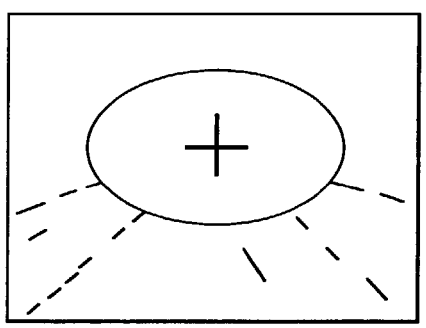
Figure 9E:
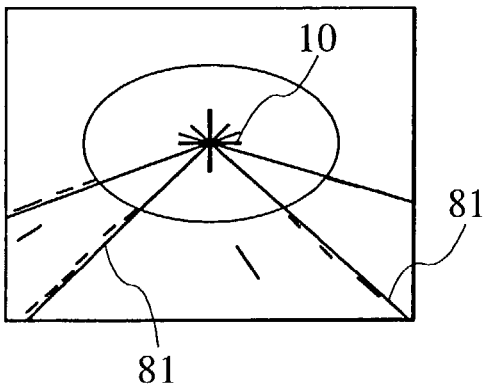

FIGS. 9A through 9E depict the steps described in the foregoing paragraphs. Processing performed by the lane marker recognition method will be once again explained with reference to FIGS. 9A through 9E. FIG. 9A shows the results of edge points extracted in step S2 from the image captured through the camera. FIGS. 9A through 9E use a segment to represent each of the edge points so that the orientation of each edge point can be readily understandable. FIG. 9B shows the state in the middle of step S3, in which all edge points included in a nearby area 91 of a vanishing point 10 calculated in the preceding frame are eliminated. FIG. 9C shows the state in which the edge points that are not oriented toward the vanishing point are removed. FIG. 9D shows the state, in which the angle histogram is analyzed and only the edge points having angles of high frequencies of occurrence and meeting the lane width condition are extracted in step S4. In the example, the angles θnl and θnr of the adjacent lane markers are left; however, only θl and θr suffice. FIG. 9E shows the results of Hough transform performed for each angle to obtain the linear approximated lines 81. The vanishing point 10 is updated to the intersection point between the linear approximated lines 81. As explained in the description made with reference to FIG. 9, the lane recognition method according to the embodiment performs processing for recognition without distinguishing white lines from road studs, which makes the method effective for a road having both white lines and road studs installed therein. It is, however, a major premise that the method is able to detect edge points of the lane marker, regardless of whether it is the white line or the road stud. It is therefore important that the image be acquired so as to yield a difference in luminance even of road studs, thereby reducing the threshold value for edge detection sufficiently low.

The edge detection technique will be explained. A variety of methods are available for detecting edge positions only. Available as methods for calculating the orientation component of the edge as well as position are the method using a Sobel filter, a two-dimensional zero-crossing method and the like. The method using the 3×3 Sobel filter will be explained according to the embodiment.

According to the method using the 3×3 Sobel filter, each of the nine pixel values surrounding a specific pixel in question is multiplied by a corresponding coefficient as shown in FIG. 11. Then, the results are summed up to arrive at edge intensity. Two coefficient matrices in the vertical and horizontal directions are used to perform this processing.

Assume that the total sum in the vertical direction is Gx and that in the horizontal direction is Gy. A pixel value G of the pixel in question is given by equation (3).

$$G = \sqrt{(Gx^2 + Gy^2)} \quad (3)$$

The pixel value G represents the intensity of the edge. The greater the value is, the greater the difference in luminance in the area surrounding that particular portion is. If the value of G is greater than a predetermined threshold value for edge extraction, the pixel at that particular portion is extracted as an edge point. The white line 1 generally has a greater difference in luminance from the road surface 3. No problem therefore arises even from setting the edge extraction threshold value arbitrarily. With the road stud 2, however, it has only a small difference in luminance from the road surface 3 in many cases. It is therefore necessary that the edge extraction threshold value be set to a sufficiently low level to prevent failure to extract points.

The edge angle θ is obtained from the directional components Gx and Gy of edge intensity using the following equation (4).

$$\theta = \begin{cases} \tan^{-1}\frac{-Gy}{Gx} & (Gx > , Gy > 0) \\ \tan^{-1}\frac{-Gy}{Gx} + 180 & (Gx < 0) \\ \tan^{-1}\frac{-Gy}{Gx} + 360 & (Gx > 0, Gy < 0) \\ 90 & (Gx = 0, Gy < 0) \\ 270 & (Gx = o, Gy > 0) \end{cases} \quad (4)$$

The angle θ represents the orientation of the edge on the screen, ranging from 0 degrees to a value less than 360 degrees as described earlier. The orientation of the edge is a direction tilted by 90 degrees to the left in relation to the direction of high luminance.

Preprocessing to be performed on the input image to enhance the recognition rate will be explained. It is desirable that the camera as the input means be installed at a level as high as practically feasible to command a surrounding view. It is still possible, however, that the camera can be installed only at a low level as when mounting it in a vehicle with a low vehicle height. The installed height of the camera is low in such cases. Then, the angle formed by edge components 121 of the left and right lane markers of the cruising lane shown on the screen becomes so wide that the edge components 121 run nearly horizontally as shown in FIG. 12A. At this time, the edge points of edge components 122 representing noise of an adjoining lane marker, a guardrail, and other vehicles running on the neighboring lanes also run nearly horizontally. As a result, there is little difference between the edge angle of the edge components 122 of the noise and that of the edge components 121 of the lane markers. In this condition, according to the lane marker recognition method of the invention, it becomes difficult to remove noise by using the angle information of the edge point, resulting in the recognition rate being lowered.

As a means for improving the recognition rate in such conditions, preprocessing is performed to change the ratio of width to height of the input image. More specifically, the input image may be compressed sidewise, or stretched in the vertical direction to create a vertically oriented image as compared with the original input image, as shown in FIG. 12B. This processing is accomplished by affine transformation. Through affine transformation, the difference between the edge angle of the edge component 121 of the lane marker and that of the edge component 122 of other noise can be made greater.

This enhances accuracy in noise removal using the angle information of edge points, which leads to an improved recognition rate in the lane marker recognition method according to the invention. To achieve the same effect as that produced from the preprocessing, it is also possible to change the shape of an optics system, that is, a lens of the camera, a photoreceiver of the CCD and the like, thereby obtaining a vertically oriented image in the very beginning.

The lane marker recognition method according to the present invention allows a lane marker composed of not only white lines, but also road studs to be detected as long as there is an edge in the lane marker position. It is therefore possible to provide an algorithm that ensures stabilized recognition without having to discriminate the type of the lane marker.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A lane marker recognition method, comprising the steps of:
    inputting an image including a lane marker;
    extracting edge points, which are luminance change points in said image;
    calculating an angle representing an orientation of each of said edge points; and
    estimating a position of the lane marker by extracting, from among the edge points extracted in the edge extracting step, those edge points for which the calculated angles have a predetermined value or fall within a predetermined range of values;
    wherein said calculated angles representing an orientation of the respective edge points are determined relative to a predetermined vanishing point.

2. The lane marker recognition method according to claim 1, wherein said predetermined value or range varies according to the position of each edge point.

3. The lane marker recognition method according to claim 1, wherein the predetermined value which the angles of the edge points extracted in the lane marker position estimating step take is the angle of a straight line connecting the edge point and a vanishing point of a road or the predetermined range of values which the angles of the edge points extracted in the lane marker position estimating step fall within is the range deviated 180 degrees from the angle of the straight line.

4. The lane marker recognition method according to claim 3, wherein the lane marker position estimating step eliminates edge points that fall within a predetermined range from the vanishing point.

5. The lane marker recognition method according to claim 3, wherein the lane marker position estimating step includes:
    creating a histogram of edge points having an angle oriented toward the vanishing point; and
    estimating a lane marker based on the edge points having angles with at least a predetermined frequency of occurrence.

6. A lane marker recognition method, comprising the steps of:
    inputting an image including a lane marker;
    extracting edge points, which are luminance change points in said image;
    calculating an angle representing an orientation of each of said edge points; and
    estimating a position of the lane marker by extracting, from among the edge points extracted in the edge extracting step, those edge points for which the calculated angles have a predetermined value or fall within a predetermined range of values; wherein,
    the predetermined value which the angles of the edge points extracted in the lane marker position estimating step take is the angle of a straight line connecting the edge point and a vanishing point of a road or the predetermined range of values which the angles of the edge points extracted in the lane marker position estimating step fall within is the range deviated 180 degrees from the angle of the straight line;
    the lane marker position estimating step eliminates edge points that fall within a predetermined range from the vanishing point; and the lane marker position estimating step includes;
creating a histogram of edge points having an angle oriented toward the vanishing point, of all the edge points falling outside a predetermined range from the vanishing point; and
estimating a lane marker based on the edge points having angles with at least a predetermined frequency of occurrence.

7. The lane marker recognition method according to claim 5, wherein the lane marker position estimating step limits all the angles with high frequencies as obtained from the histogram to the angles of left and right lane markers based on a lane width.

8. The lane marker recognition method according to claim 7, wherein the lane marker position estimating process makes linear approximation of the lane marker position from a distribution of edge points having the angles of the lane markers.

9. A lane marker recognition method, comprising the steps of:
inputting an image including a lane marker;
changing in advance a ratio of width to height of said image, to create a changed image;
extracting edge points, which are luminance change points in said changed image;
calculating an angle representing an orientation of each of the edge points; and
estimating a position of the lane marker by extracting, from among the edge points extracted in the edge extracting step, those edge points for which the calculated angles have a predetermined value or fall within a predetermined range of values;
wherein said calculated angles representing an orientation of the respective edge points are determined relative to a predetermined vanishing point.

* * * * *